United States Patent
Suciu et al.

(10) Patent No.: US 9,109,464 B2
(45) Date of Patent: Aug. 18, 2015

(54) DISTRIBUTED LUBRICATION SYSTEM

(75) Inventors: Gabriel L. Suciu, Glastonbury, CT (US); Jorn A. Glahn, Manchester, CT (US); Brian D. Merry, Andover, CT (US); Christopher M. Dye, Glastonbury, CT (US); Nathan Snape, Tolland, CT (US); Matthew J. Howlett, North Haven, CT (US); Matthew G. Dixon, Vernon Rockville, CT (US)

(73) Assignee: United Technologies Corporation, Hartford, CT (US)

( * ) Notice: Subject to any disclaimer, the term of this patent is extended or adjusted under 35 U.S.C. 154(b) by 987 days.

(21) Appl. No.: 13/222,183

(22) Filed: Aug. 31, 2011

(65) Prior Publication Data

US 2013/0047624 A1   Feb. 28, 2013

(51) Int. Cl.
| F01D 25/18 | (2006.01) |
| F01D 25/20 | (2006.01) |
| F01D 25/12 | (2006.01) |
| F02C 7/06 | (2006.01) |
| F02C 7/14 | (2006.01) |

(52) U.S. Cl.
CPC ............... *F01D 25/20* (2013.01); *F01D 25/125* (2013.01); *F01D 25/18* (2013.01); *F02C 7/06* (2013.01); *F02C 7/14* (2013.01); *F05D 2260/98* (2013.01); *Y02T 50/675* (2013.01)

(58) Field of Classification Search
CPC ............... F02C 6/08; F02C 7/06; F02C 7/18; F02C 7/12; F02C 7/14; F01D 25/08; F01D 25/12; F01D 25/125; F01D 25/16; F01D 25/18; F05D 2260/98

USPC .......... 60/226.1, 782, 785, 39.08, 802, 39.83; 184/6.11

See application file for complete search history.

(56) References Cited

U.S. PATENT DOCUMENTS

| 4,722,666 | A | * | 2/1988 | Dennison et al. | 416/94 |
| 5,615,547 | A | * | 4/1997 | Beutin et al. | 60/39.08 |
| 5,987,877 | A | * | 11/1999 | Steiner | 60/39.08 |
| 7,213,391 | B2 | * | 5/2007 | Jones | 60/226.1 |
| 7,231,767 | B2 | | 6/2007 | Whiting | |
| 7,658,060 | B2 | | 2/2010 | Zysman et al. | |
| 7,805,947 | B2 | | 10/2010 | Moulebhar | |
| 7,836,680 | B2 | | 11/2010 | Schwarz et al. | |
| 7,861,512 | B2 | | 1/2011 | Olver et al. | |
| 7,886,520 | B2 | | 2/2011 | Stretton et al. | |
| 2008/0006022 | A1 | * | 1/2008 | Schwarz et al. | 60/204 |
| 2008/0121376 | A1 | * | 5/2008 | Schwarz et al. | 165/104.28 |
| 2010/0019496 | A1 | * | 1/2010 | Yu | 290/52 |
| 2010/0024434 | A1 | * | 2/2010 | Moore et al. | 60/788 |

* cited by examiner

*Primary Examiner* — Andrew Nguyen
(74) *Attorney, Agent, or Firm* — Kinney & Lange, P.A.

(57) ABSTRACT

A gas turbine engine includes a spool, a gearbox having gearing driven by the spool, and a lubrication system. The lubrication system includes a first heat exchanger positioned in a first air flow path, a second heat exchanger positioned in a second air flow path, and a lubrication pump fluidically connected to both the first heat exchanger and the second heat exchanger. A first air fan is driven by the gearbox for inducing air flow through the first air flow path. A second air fan is driven by an electric motor for inducing air flow through the second air flow path.

9 Claims, 4 Drawing Sheets

DISTRIBUTED LUBRICATION SYSTEM

BACKGROUND

The present invention relates to gas turbine engines, and in particular, to lubrication systems on gas turbine engines.

Generally, gas turbine engines include lubrication systems that supply lubricating liquid to various components. That lubricating liquid typically absorbs large amounts of heat and requires cooling. Air-to-oil heat exchangers are commonly employed to cool the lubricating liquid via a flow of air. Such heat exchangers are typically sized for the maximum amount of cooling that a lubrication system is expected to need at the most extreme operating conditions. Thus, such heat exchangers can be relatively large, adding undesirable weight, taking up valuable space, and reducing efficiency. In gas turbine engines with a relatively slow fan speed, such heat exchangers typically need to be even larger and heavier in order to perform a suitable amount of cooling.

SUMMARY

According to the present invention, a gas turbine engine includes a spool, a gearbox having gearing driven by the spool, and a lubrication system. The lubrication system includes a first heat exchanger positioned in a first air flow path, a second heat exchanger positioned in a second air flow path, and a lubrication pump fluidically connected to both the first heat exchanger and the second heat exchanger. A first air fan is driven by the gearbox for inducing air flow through the first air flow path. A second air fan is driven by an electric motor for inducing air flow through the second air flow path.

Another embodiment of the present invention is a method for operating a lubrication system on a gas turbine engine. The method includes pumping lubricating liquid through a first heat exchanger positioned in a first air flow path, pumping lubricating liquid through a second heat exchanger positioned in a second air flow path, inducing air flow through the first air flow path via a first air fan driven by the gas turbine engine through gearing, and inducing air flow through the second air flow path via a second air fan driven by an electric motor.

DETAILED DESCRIPTION

Figure 1:
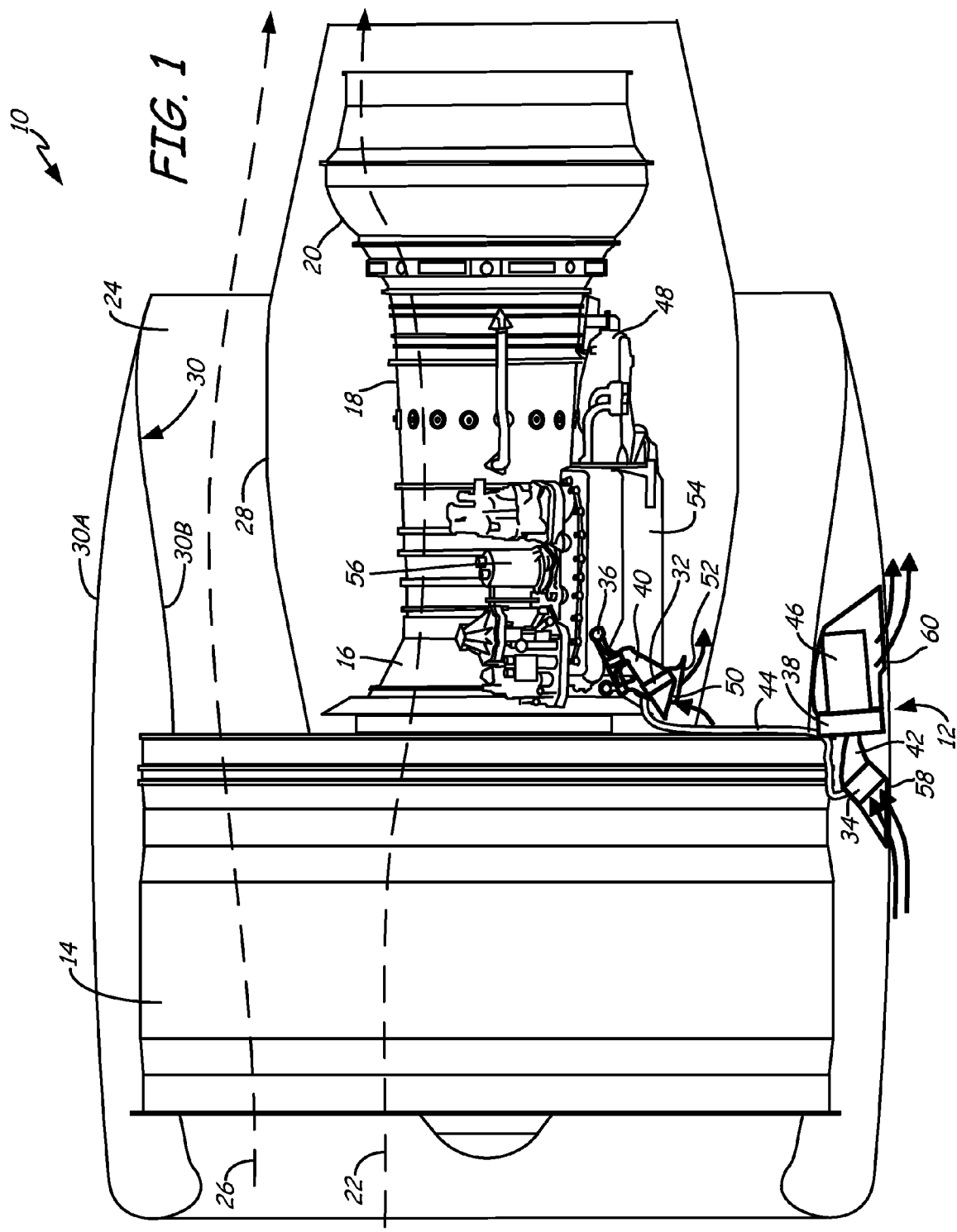
FIG. 1 is a schematic side view of a gas turbine engine having a lubrication system.

FIG. 1 is a schematic side view of gas turbine engine 10 having lubrication system 12. Gas turbine engine 10 includes propulsion fan section 14, compressor section 16, combustor section 18, and turbine section 20. Gas turbine engine 10 can have one or more spools (shown in the block diagrams of FIGS. 3A and 3B) extending from main compressor section 14 to main turbine section 18. A spool can be connected to a propulsion fan (not shown) in propulsion fan section 14 either conventionally or through reduction gearing (not shown). Air flows from propulsion fan section 14, through compressor section 14 to turbine section 18 along main flow path 22. Air also flows from propulsion fan section 14 through fan bypass 24 along bypass flow path 26. Fan bypass 24 is bounded at its inner diameter (ID) by core cowling 28 and at its outer diameter (OD) by OD fan case 30. OD fan case 30 has radially outer surface 30A and radially inner surface 30B. The general construction and operation of gas turbine engines is well-known in the art, and therefore detailed discussion here is unnecessary.

Lubrication system 12 includes heat exchangers 32 and 34, fans 36 and 38, air flow paths 40 and 42, lubrication circuit 44, electric motor 46, and pump 48. Heat exchanger 32 and fan 36 are positioned in air flow path 40, with heat exchanger 32 being upstream of fan 36. Air flow path 40 is positioned inside core cowling 28, extending from fan bypass 24 at inlet 50 through heat exchanger 32, through fan 36, and then back to fan bypass 24 at outlet 52. Thus, both heat exchanger 32 and fan 36 are positioned inside core cowling 28.

Fan 36 is driven by gearbox 54. Gearbox 54 has gearing driven by a spool of gas turbine engine 10. Various accessories are mounted to and driven by gearbox 54, including fan 36, pump 48, and generator 56. In the illustrated embodiment, fan 36 is a centrifugal impeller positioned substantially inside gearbox 54. In operation, fan 36 is driven by gearbox 54 for inducing air flow through air flow path 40. Pump 48 and generator 56 are accessories mounted substantially outside of gearbox 54. Generator 56 is an electrical generator for generating electric power used by components of gas turbine engine 10 and its associated aircraft (not shown). In the illustrated embodiment, gearbox 54 is an axial accessory gearbox. In alternative embodiments, gearbox 54 can be a conventional accessory gearbox, a towershaft housing, or a layshaft housing.

Heat exchanger 34 and fan 38 are positioned in air flow path 42, with heat exchanger 34 being upstream of fan 38. Air flow path 40 is positioned in OD fan case 30, extending through radially outer surface 30A at inlet 58 through heat exchanger 34, through fan 38, and then back through outer surface 30A at outlet 60. Thus, inlet 58 and outlet 60 both connect air flow path 42 to free stream air outside of OD fan case 30. In alternative embodiments, inlet 58 can extend through radially outer surface 30A and outlet 60 can extend through radially inner surface 30B. In operation, electric motor 46 drives fan 38 to induce air flow through air flow path 42.

Pump 48 is a lubrication pump for pumping lubricating liquid, such as oil, to both heat exchangers 32 and 34. Pump 48 is fluidically connected to heat exchangers 32 and 34 via lubrication circuit 44, as further described with respect to FIGS. 3A and 3B. Thus, lubrication system 12 can cool lubricating liquid using both propulsion fan air flowing through fan bypass 24, via heat exchanger 32, as well as with free stream air flowing outside of OD fan case 30, via heat exchanger 34.

When gas turbine engine 10 is operating, gearbox 54 operates substantially continuously, and consequently, fan 36 operates continuously drawing air through heat exchanger 32 to cool lubricating liquid. However, electric motor 46 can be modulated, consequently allowing fan 38 to be modulated as desired. Thus, while fan 36 operates to cool the lubricating liquid whenever gas turbine engine 10 is operating, fan 38 operates to cool the lubricating liquid only when additional cooling is desired. Additional cooling can be particularly desirable when gas turbine engine 10 is operating slowly and/or on particularly hot days. Moreover, fan 38 need not be switched only between on or off. Rather, the speed of electric motor 46 can be varied according to cooling requirements of lubrication system 12.

Figure 2:
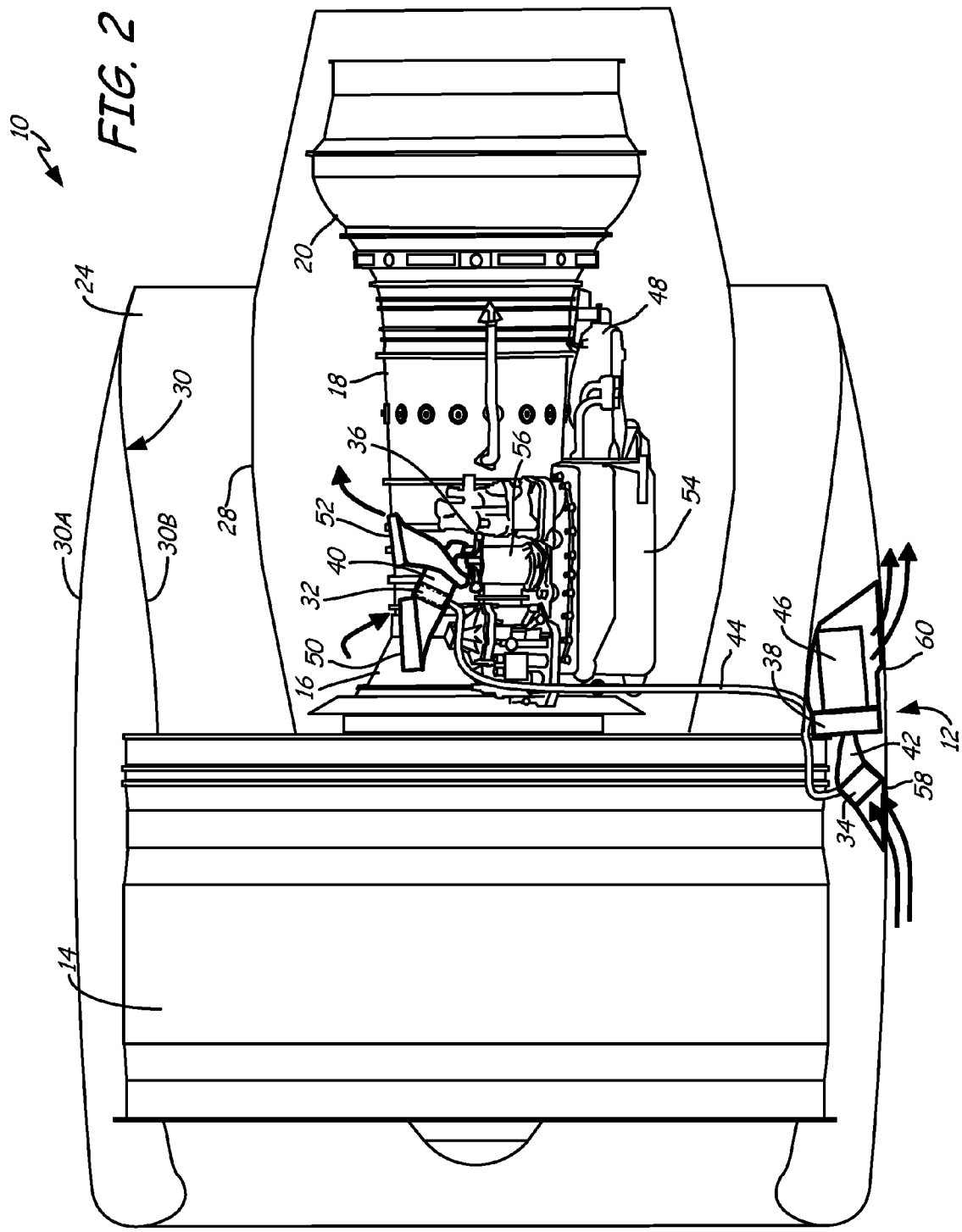
FIG. 2 is a schematic side view of a gas turbine engine having an alternative embodiment of the lubrication system of FIG. 1.

FIG. 2 is a schematic side view of gas turbine engine 10 having lubrication system 12', which is an alternative embodiment of lubrication system 12 (shown in FIG. 1). Lubrication system 12' is substantially the same as lubrication system 12 except that fan 36 is mounted to and integrated with generator 56, as opposed to being positioned inside gearbox 54 as in FIG. 1. Fan 36 is mounted to and driven by generator 56, which is in turn mounted to and driven by gearbox 54. Thus, when gas turbine 10 is operating, fan 36 operates substantially continuously drawing air from fan bypass 24 through heat exchanger 32 to cool lubricating liquid. In alternative embodiments, fan 36 can be mounted to and integrated with another relatively high speed accessory driven by gearbox 54.

In the embodiments illustrated with respect to FIGS. 1 and 2, fan 36 is positioned downstream of heat exchanger 32 for drawing air over heat exchanger 32. In one embodiment, the pressure ratio over fan 36 can be between about 1.1 and about 1.5. That is, the pressure of air downstream of fan 36 is about 1.1 to about 1.5 times that of the pressure upstream of fan 36. By positioning fan 36 downstream of heat exchanger 32, heat exchanger 32 can receive air when it is relatively cool, as opposed to air having been compressed and heated by fan 36. In alternative embodiments, fan 36 can be positioned upstream of heat exchanger 32. Similarly, fan 38 can be positioned upstream of heat exchanger 34.

Figure 3A:
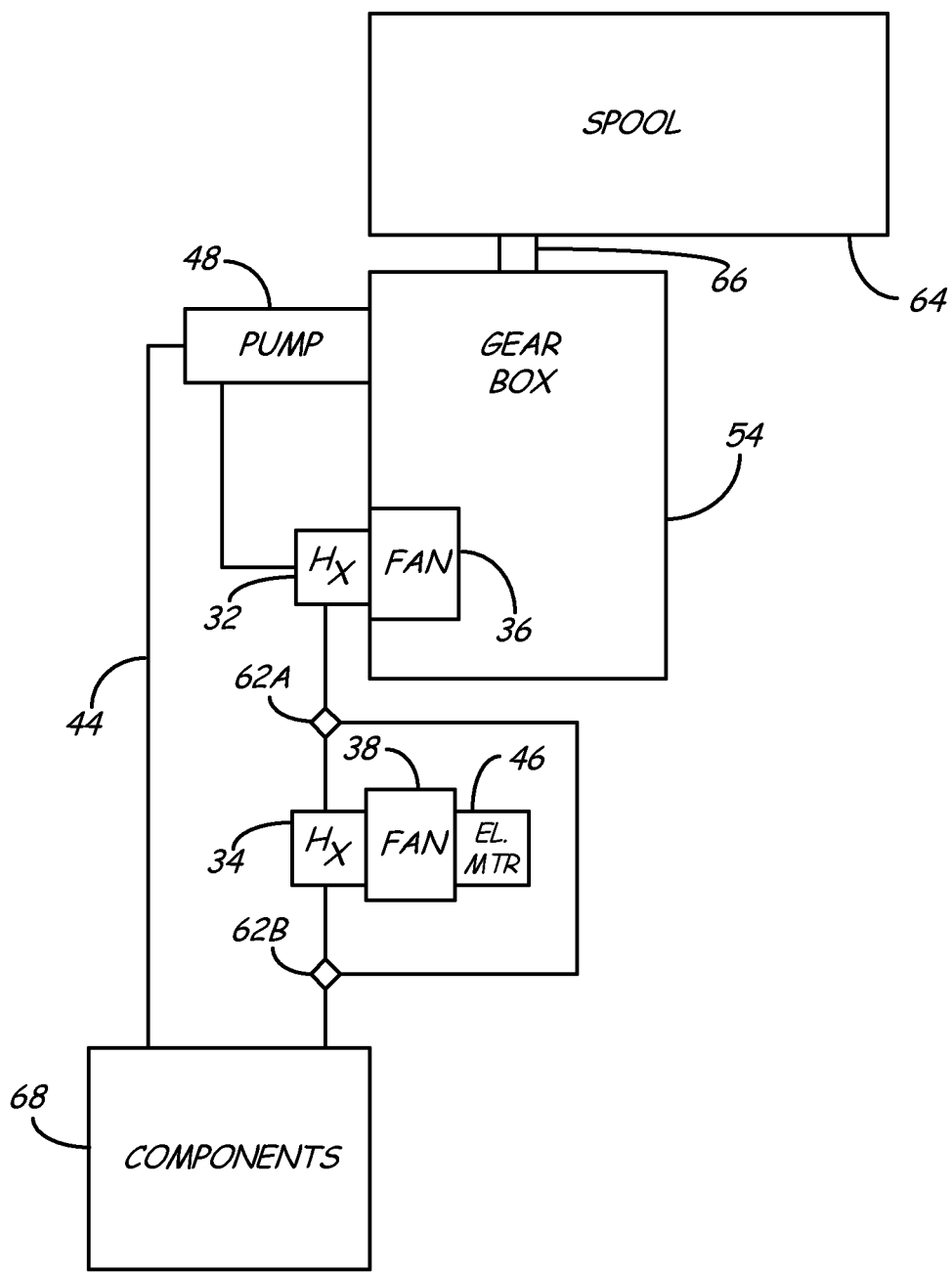
FIG. 3A is a block diagram of the lubrication system of FIG. 1 with heat exchangers connected in series.

FIG. 3A is a block diagram of lubrication system 12 with heat exchangers 32 and 34 connected in series via lubrication circuit 44. Lubrication circuit 44 includes bypass valves 62A and 62B for selectively reducing flow of lubricating liquid to heat exchanger 34. In operation, spool 64 rotates and drives rotation of tower shaft 66, which drives gearbox 54. Gearbox 54, in turn, drives both pump 48 and fan 36. Pump 48 pumps lubricating liquid through heat exchanger 32 to be cooled. If the lubricating liquid requires additional cooling, bypass valves 62A and 62B can direct the lubricating liquid from heat exchanger 32 to and though heat exchanger 34. Electric motor 46 can be activated to draw air through heat exchanger 34 to further cool the lubricating liquid, which is then directed to components 68 that benefit from lubrication and/or cooling, such as gears and bearings. The lubricating liquid can then be returned to pump 48.

If, however, engine operating conditions are such that heat exchanger 32 can adequately cool the lubricating liquid without assistance from heat exchanger 34, then bypass valves 62A and 62B can direct the lubricating liquid to bypass around heat exchanger 34 and flow directly to components 68. In that case, fan 38 and electric motor 46 can be left idle until additional cooling is needed, thus reducing energy consumption and improving efficiency of gas turbine engine 10 (shown in FIGS. 1 and 2).

Figure 3B:
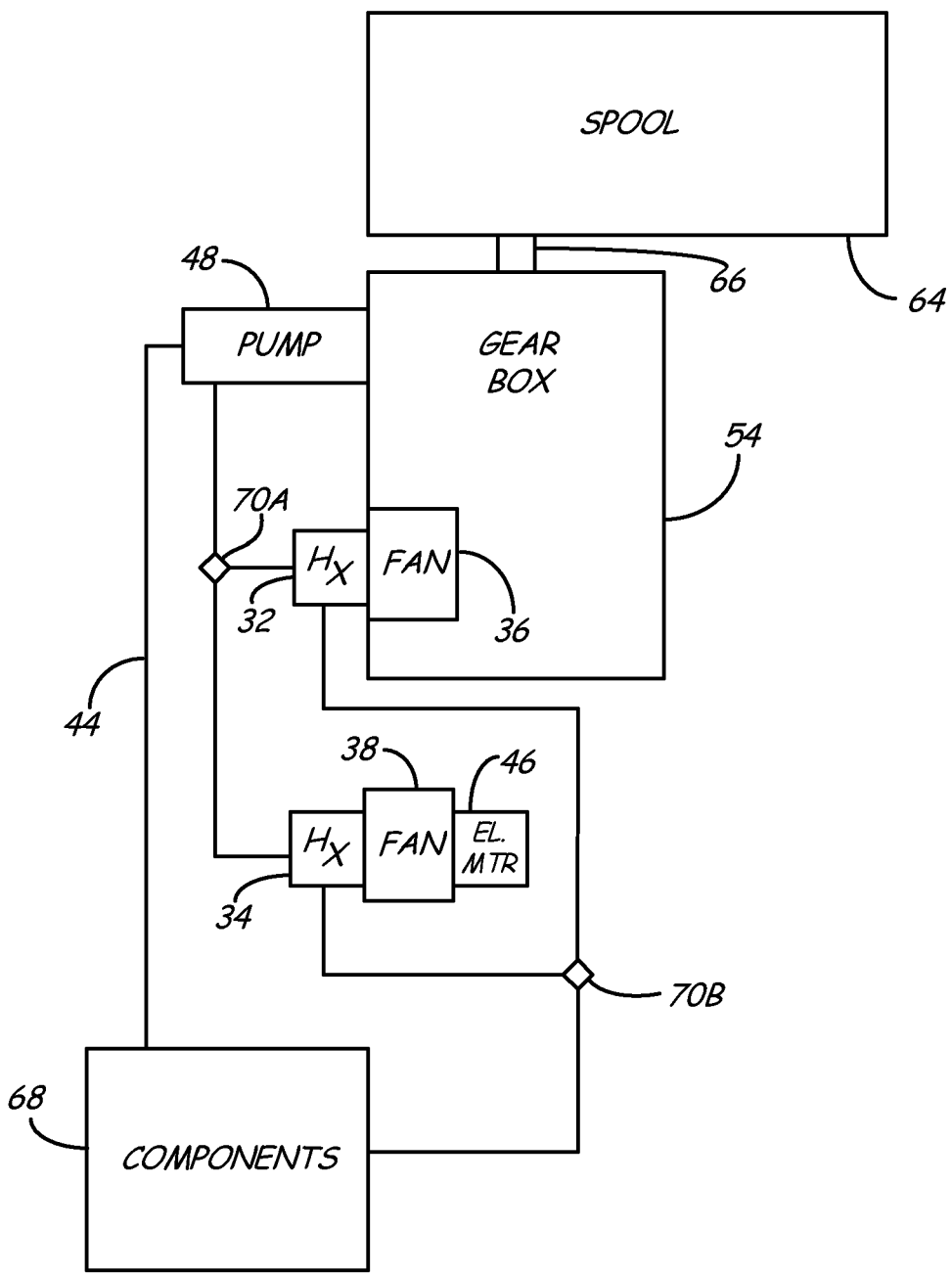
FIG. 3B is a block diagram of the lubrication system of FIG. 1 with heat exchangers connected in parallel.

FIG. 3B is a block diagram of lubrication system 12 with heat exchangers 32 and 34 connected in parallel via lubrication circuit 44'. Lubrication circuit 44' includes valves 70A and 70B for selectively reducing flow of lubricating liquid to heat exchanger 34. In operation, spool 64 rotates and drives rotation of tower shaft 66, which drives gearbox 54. Gearbox 54, in turn, drives both pump 48 and fan 36. Pump 48 pumps lubricating liquid to valve 70A. If the lubricating liquid requires a relatively large amount of cooling, valve 70A can direct the lubricating liquid both to heat exchanger 32 and to heat exchanger 34. Electric motor 46 can be activated to draw air through heat exchanger 34 to cool the lubricating liquid. Cooled lubricating liquid from both heat exchanger 32 and heat exchanger 34 are directed to valve 70B, which directs the lubricating liquid to components 68 and then back to pump 48.

If, however, engine operating conditions are such that heat exchanger 32 can adequately cool the lubricating liquid without assistance from heat exchanger 34, then valves 70A and 70B can direct the lubricating liquid only to heat exchanger 32, bypassing heat exchanger 34, and then to components 68. In that case, fan 38 and electric motor 46 can be left idle until additional cooling is needed, thus reducing energy consumption and improving efficiency of gas turbine engine 10 (shown in FIGS. 1 and 2).

In the embodiments shown in FIGS. 3A and 3B, fan 36 is positioned inside gearbox 54, as in FIG. 1. In alternative embodiments, fan 36 can be mounted to an accessory driven by gearbox 54, such as generator 56 as illustrated in FIG. 2.

Thus, the various embodiments of lubrication systems described above can provide several benefits. By using fans 36 and 38 to draw air over heat exchangers 32 and 34, respectively, heat exchangers 32 and 34 can be relatively small while providing cooling performance on par with much larger heat exchangers. This allows for reduced weight and size, improved duct design, and increased efficiency. Reducing size of heat exchangers also allows for reduced size in ducting and associated hardware. Additionally, by using separate heat exchangers 32 and 34, one can be positioned inside core cowling 28 with its corresponding fan 36 driven by gearbox 54, and the other can be positioned in OD fan case 30 with its corresponding fan 38 driven by electric motor 46. Thus, cooling can be performed by a single relatively small heat exchanger 32 and fan 36 during normal operating conditions, reserving use of heat exchanger 34 and fan 38 for conditions that have relatively high cooling requirements. This allows for increased operating efficiency of gas turbine engine 10. By positioning fan 36 inside gearbox 54 as in FIG. 1, space outside of gearbox 54 can be saved. By positioning fan 36 on a relatively high speed accessory (such as generator 56) mounted to gearbox 54 as in FIG. 2, fan 36 can be driven by gearbox 54 outside of gearbox 54 without requiring a dedicated mounting pad on gearbox 54. Overall, the various embodiments described above allow for greater design flexibility.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, lubrication circuits 44 and 44' need not be connected precisely as illustrated in FIGS. 3A and 3B but can be modified as necessary for particular applications. Similarly, lubrication systems 12 and 12' need not be used only with the illustrated gas turbine engine 10, but can be used with other gas turbine engines that benefit from a distributed lubrication system. Moreover, lubrication systems 12 and 12' can include one or more additional pumps, valves, filters, sensors, or other components. Fans 36 and 38 can be centrifugal impellers, axial fans, or another type of air fan.

The invention claimed is:
1. A gas turbine engine comprising:
a spool;
a gearbox having gearing driven by the spool;

a lubrication system comprising:
- a first heat exchanger positioned in a first air flow path;
- a second heat exchanger positioned in a second air flow path; and
- a lubrication pump fluidically connected to both the first heat exchanger and the second heat exchanger;

a first air fan configured to be driven continuously by the gearbox during operation of the gas turbine engine for inducing air flow through the first air flow path, wherein the first air fan comprises a centrifugal impeller positioned substantially inside the gearbox; and a second air fan configured to be driven by an electric motor at a modulated speed for inducing air flow through the second air flow path.

2. The gas turbine engine of claim 1, wherein the first air fan is positioned downstream of the first heat exchanger and the second air fan is positioned downstream of the second heat exchanger.

3. The gas turbine engine of claim 1, wherein the gearbox is an axial accessory gearbox.

4. The gas turbine engine of claim 1, wherein the first and second heat exchangers are connected in series.

5. The gas turbine engine of claim 1, wherein the first and second heat exchangers are connected in parallel.

6. The gas turbine engine of claim 1, wherein the first heat exchanger is positioned inside a core cowling of the gas turbine engine and the second heat exchanger is positioned in an outer diameter (OD) fan case.

7. The gas turbine engine of claim 1, wherein the first air flow path extends from a fan bypass through the first heat exchanger and then back to the fan bypass.

8. The gas turbine engine of claim 1, wherein the second air flow path extends from free stream air outside of an outer diameter (OD) fan case through the second heat exchanger and then back to the free stream air.

9. The gas turbine engine of claim 1, and further comprising:
- a bypass valve for reducing flow from the lubrication pump to the second heat exchanger.

* * * * *